(12) United States Patent
Mayr

(10) Patent No.: US 9,410,632 B2
(45) Date of Patent: Aug. 9, 2016

(54) SHUT-OFF VALVE

(71) Applicant: MAGNA STEYR Engineering AG & Co KG, Graz (AT)

(72) Inventor: Franz Mayr, St. Marein bei Graz (AT)

(73) Assignee: MAGNA STEYR Engineering AG & Co KG, Graz (AT)

( * ) Notice: Subject to any disclaimer, the term of this patent is extended or adjusted under 35 U.S.C. 154(b) by 41 days.

(21) Appl. No.: 14/659,883

(22) Filed: Mar. 17, 2015

(65) Prior Publication Data

US 2015/0260305 A1 Sep. 17, 2015

(30) Foreign Application Priority Data

Mar. 17, 2014 (EP) .................................... 14160244

(51) Int. Cl.
*F16K 17/34* (2006.01)
*F16K 17/04* (2006.01)
*F16K 17/30* (2006.01)

(52) U.S. Cl.
CPC ............ *F16K 17/0493* (2013.01); *F16K 17/30* (2013.01); *F17C 2205/0335* (2013.01); *F17C 2205/0382* (2013.01); *F17C 2205/0394* (2013.01); *F17C 2270/0168* (2013.01)

(58) Field of Classification Search
CPC ... F16K 17/0493; F16K 17/30; F16K 31/122; F17C 2205/0382; F17C 2205/0335; F17C 2205/0394

USPC ............................................. 137/517, 516.25
See application file for complete search history.

(56) References Cited

U.S. PATENT DOCUMENTS

| 2,821,209 | A | * | 1/1958 | Waterman | ............... | F16K 17/30 |
| | | | | | | 137/498 |
| 3,727,633 | A | | 4/1973 | Stone et al. | | |

FOREIGN PATENT DOCUMENTS

| DE | 3102743 A1 | 9/1982 |
| EP | 0837280 B1 | 9/2003 |
| WO | 02/084154 A1 | 10/2002 |

\* cited by examiner

*Primary Examiner* — Kevin Lee
*Assistant Examiner* — P. Macade Nichols
(74) *Attorney, Agent, or Firm* — Todd A. Vaughn; Jordan IP Law, LLC

(57) ABSTRACT

A shut-off valve to fill a tank with a gaseous medium. The shut-off valve includes a valve housing, a piston arranged in the valve housing for displacement in an axial direction and having an axially continuous bore, a first end piece having an outlet opening which is fluidically-connected to the axially continuous bore of the piston; and a second end piece having an inlet opening which is fluidically-connected to the axially continuous bore of the piston. A first end side of the piston and a first end side of the second end piece of the valve housing form a sealing seat upon contact therebetween.

20 Claims, 2 Drawing Sheets

SHUT-OFF VALVE

CROSS-REFERENCE TO RELATED APPLICATIONS

The present application claims priority 35 U.S.C. §119 to European Patent Publication No. EP 14160244.1 (filed on Mar. 17, 2014), which may be hereby incorporated by reference in its entirety.

TECHNICAL FIELD

Embodiments relate to a shut-off valve to fill a tank with a gaseous medium. The shut-off valve includes a valve housing, a piston arranged in the valve housing for displacement in an axial direction and having an axially continuous bore, a first end piece having an outlet opening which is fluidically-connected to the axially continuous bore of the piston; and a second end piece having an inlet opening which is fluidically-connected to the axially continuous bore of the piston. A first end side of the piston and a first end side of the second end piece of the valve housing form a sealing seat upon contact therebetween.

BACKGROUND

During filling of tanks with gaseous media, the filling is to be ended after a defined filling degree has been reached. In filling systems which communicate via infrared interfaces, for example, with a motor vehicle, there is the problem that filling is not possible in the case of fouling, damage or an unsuitable spacing of the infrared interfaces.

A solution is therefore sought which automatically ends a filling operation when the tank is full. One possibility is electromagnetically actuated valves which open and close on the basis of signals. There is the risk here, however, that the explosive gaseous medium may ignite as a result of spark formation. A solution is therefore sought, in which a valve is used which is of purely mechanical configuration and ends the filling operation when the defined filling degree has been reached.

Mechanically actuated valves are configured in such a way that, after a defined pressure has been reached, the valve closes automatically and further filling is thus prevented. European Patent Publication No. EP 0837280B1 discloses a one-way valve, comprising the valve cone, the valve cone guide, the valve seat and the spring, which is designed to permit the fluid flow in the downstream direction from the inlet opening to the outlet opening and to restrict the fluid flow in the upstream direction from the outlet opening to the inlet opening.

SUMMARY

Embodiments relate to an enhanced shut-off valve which permits filling of a tank, the shut-off valve, actuated purely mechanically, to prevent further feeding of a gaseous medium after a defined pressure has been reached, independently of whether pressure increases, pressure decreases or pressure fluctuations occur on the feed side.

Embodiments relate to an enhanced flow behaviour of a gaseous medium from an inlet opening in the direction of an outlet opening of the shut-off valve in accordance with embodiments, in order to achieve more rapid filling and an optimum filling degree of the tank.

In accordance with embodiments, a shut-off valve for filling a tank with a gaseous medium, the shut-off valve including at least one of: a valve housing having a first end piece with an outlet opening, and a second end piece having an inlet opening; a piston which is axially displaceable in the valve housing, and which has an axially continuous piston bore which is fluidically-connected to the outlet opening and the inlet opening, and a first end side to form, upon contact with the second end piece, a sealing seat; a flow guiding device downstream of the inlet opening and which has at least one bore of the second end piece and a chamber, which bore leads radially to the outside and is fluidically-connected to the inlet opening of the second end piece, the chamber being configured between the piston and the second end piece, with the result that the gaseous medium is to flow from the inlet opening via the at least one radially outwardly arranged bore of the second end piece into the chamber and the gaseous medium in the chamber is directed from the outside to the inside in the direction of the first end side of the second end piece and a deflection of the gaseous medium is brought about in the direction of the axially continuous bore of the piston.

In accordance with embodiments, a shut-off valve may include at least one of: a valve housing having a first end piece with an outlet opening, and a second end piece having an inlet opening and a first end side; a piston axially displaceable in the valve housing and having an axially continuous piston bore which is fluidically-connected to the outlet opening and the inlet opening, and a first end side which, upon contact, forms a seal with the first end side; a flow guiding device downstream of the inlet opening and defining with the second end piece at least one radially-outwardly bore which is fluidically-connected to the inlet opening; and a chamber between the piston and the second end piece, wherein the gaseous medium is to flow from the inlet opening via the at least one bore into the chamber, where it is then directed towards the first end side of the second end piece where the gaseous medium deflected towards piston bore.

In accordance with embodiments, a shut-off valve may include at least one of: a valve housing; a first end piece connected at one end of the valve housing, and having an outlet opening axially extending therethrough; a second end piece connected at another end of the valve housing, and having an inlet opening axially extending therethrough; a piston axially displaceable in the valve housing between the first and second end pieces, and which upon contact, forms a seal with the first end piece, and further which has a piston bore axially extending therethrough which is fluidically-connected to the outlet opening and the inlet opening; a flow guiding device downstream of the inlet opening and defining with the second end piece at least one radially-outwardly bore which is fluidically-connected to the inlet opening; and a chamber between the piston and the second end piece, wherein the gaseous medium is to flow from the inlet opening via the at least one bore into the chamber, and then directed towards the second end piece where the gaseous medium is deflected towards the piston bore.

In accordance with embodiments, the valve housing may comprise a substantially hollow cylinder, in each case one internal thread is attached at both ends in the valve housing. A piston is arranged for axial displacement in the valve housing. The piston has an axially continuous bore which is fluidically-connected on one side to an inlet opening of the second end piece and on the other side to the outlet opening of the first end piece. Upon contact with a first end side of the second end piece, a first end side of the piston forms a sealing seat which seals in accordance with a set or predetermined shut-off pressure, and ignores (and remains closed) a further pressure increase, pressure decrease or any pressure fluctuations on the inlet side of the second end piece, for example, pressure fluctuations caused by the filling system.

Opening of the shut-off valve is not possible without a pressure decrease on the outlet side of the first end piece or upon removal of medium from the tank or the tank system, which removal is caused by usual operation. The end side of the piston and end side of the second end piece are also understood to mean any end-side structural formation which is provided for configuring the sealing seat. For example, as will be described in greater detail later, the first end side of the second end piece may have a contour, in particular a concave contour. The piston is spaced apart from the first end side of the second end piece in the pressureless state.

In accordance with embodiments, a flow guiding device is arranged downstream of the inlet opening. The flow guiding device serves to enhance flow of the gaseous medium from the inlet opening in the direction of the outlet opening by way of targeted deflection of the flow of the gaseous medium. The flow guiding device comprises substantially bores of the second end piece, and a chamber, which bores lead radially to the outside and are fluidically-connected to the inlet opening of the second end piece, and by way of which chamber the gaseous medium is directed from the outside to the inside in the direction of the first end side of the second end piece and a deflection of the gaseous medium is brought about in the direction of the axially continuous bore of the piston. The chamber is arranged substantially between the piston and the second end piece and is delimited by an inner wall of the valve housing.

This solution in accordance with embodiments is advantageous, above all, since the gap between the piston and the second end piece becomes smaller and smaller during filling as the pressure in the tank increases, as a result of which the flow channel is narrowed. Embodiments achieve an enhanced filling degree, since the flow channel makes optimum throughflow of the gaseous medium possible until the valve closes.

The shut-off valve is suitable, in particular, for media such as hydrogen, methane, natural gas or a mixture of hydrogen and natural gas. The use of other types of liquid media, such as, for example, liquid petroleum gas (LPG), is also suitable as a result of a modification of the shut-off valve in accordance with embodiments.

The result is a purely mechanical shut-off valve which closes the passage opening sealingly above a defined pressure on account of a set/predetermined spring force and opens neither in the case of a further pressure increase nor a pressure decrease down to a vacuum in the feed opening and therefore always remains closed. The removal of medium takes place at one or more different locations in the pressure accumulator system.

In accordance with embodiments, a bulge is arranged on the first end side of the second end piece. The bulge is to cause a rapid deflection of the gaseous medium in the direction of the axially continuous bore of the piston.

In accordance with embodiments, the first end piece and/or the second end piece are/is separate components. The first end piece and/or the second end piece are/is fastened to the valve housing. The fastening to the valve housing may take place by way of a suitable known method such as, for example adhesive bonding, brazing, welding, pressing or screwing.

In accordance with embodiments, the first end piece is arranged so as to lie opposite the second end piece. As a result of this arrangement, the valve housing may be of particularly compact and simple configuration.

In accordance with embodiments, the bulge of the second end piece is configured so as to be substantially coaxial with the centre axis of the axially continuous bore of the piston. This ensures that the flow of the gaseous medium takes place in an optimum manner, in particular if the individual components of the shut-off valve are configured as rotational parts. It is also prevented in this way that, in the closed state of the shut-off valve, the bulge of the second end piece may come into contact with the piston, since the bulge protrudes into the axially continuous bore of the piston.

The bulge of the second end piece may be configured as a point having substantially the shape or cross-section of a cylindrical cone or truncated cone. The maximum diameter, or at least the mean diameter of the bulge of the second end piece may be less than the diameter of the axially continuous bore of the piston. This ensures that the gaseous medium may flow with a low or otherwise reduced flow resistance into the axially continuous bore of the piston.

In accordance with embodiments, the first end side of the second end piece has a radially circumferential, approximately concave formation. The radially circumferential, approximately concave formation is to form a running transition with the point. As a result of this geometric refinement, the gaseous medium is directed particularly rapidly and efficiently into the axially continuous bore of the piston.

In accordance with embodiments, the radially outwardly leading bores of the second end piece together have a cross-section which corresponds at least to the cross-section of the inlet opening of the second end piece. This ensures that no throttling or back pressure of the flow of the gaseous medium may occur on account of an excessively small cross-section.

In a further inventive embodiment, the valve housing has a first end side in the cavity, which first end side has a radially circumferential, approximately concave formation, the radially circumferential, concave formation extending between the inner wall of the valve housing and the cavity. As a result, the gaseous medium is deflected more rapidly in the direction of the bulge of the second end piece.

In accordance with embodiments, the radially outwardly leading bores of the second end piece are arranged offset tangentially with respect to the centre axis of the inlet opening of the second end piece. By way of the tangential offset, the outflowing gaseous medium is intended to have a swirl imparted to it, as a result of which the flow stream may be aided further. This is advantageous, above all, since the gap between the piston and the second end piece becomes smaller and smaller and therefore the flow channel is narrowed as the pressure rises.

In accordance with embodiments, an elastic element is arranged between a second end side of the piston and a second end side of the housing valve. The second end side of the piston may be configured as an end side of a collar of the piston. The collar is arranged between the first sliding face of the piston and the second sliding face of the piston. The second end face of the piston, or of the collar of the piston, faces the second sliding face of the piston. The second end side of the valve housing faces away from the first end side of the valve housing and faces the second end side of the piston.

In accordance with embodiments, at least one disc spring may be used as elastic element. Disc springs afford the advantage that relatively high forces may be transmitted in a relatively small installation space. The elastic element is configured in such a way that it prestresses the piston against an end side of the first end piece in the pressureless state. The elastic element may comprise a disc spring assembly which applies a spring force, in order to press the piston against the first end wall of the first end piece. This ensures that the gap or the chamber between the first end side of the piston and the first end side of the second end piece and therefore the flow channel are as large as possible and the gaseous medium may flow into the tank in an unimpeded manner until filling is ended. As a result, vibrations are also avoided in the valve housing.

In accordance with embodiments, at least one first seal element is arranged between a first sliding face of the piston and the valve housing. The at least one first seal element may be arranged in the region between the first end side and the second end side of the valve housing. The at least one first seal element is configured in such a way so as to withstand the high pressure which occurs at the inlet opening of the second end piece during filling. Furthermore, the at least one first seal element is configured in such a way that the piston may slide axially on the at least one seal element. At the same time, the at least one first seal element serves as a mounting of the piston. The at least one first seal element is arranged in a groove in the valve housing. The groove is arranged in a region between the first end side and the second end side of the valve housing.

In accordance with embodiments, at least one second seal element is arranged between a second sliding face of the piston and the first end piece. The at least one second seal element is arranged in the region between the end side of the first end piece and the collar of the piston. The at least one second seal element is likewise configured in such a way that the piston may firstly slide axially and is secondly mounted by the at least one seal element. Since a similarly high pressure occurs at the outlet opening of the first end piece in the case of a fully filled tank as at the inlet opening of the second end piece during filling, the at least one second seal element likewise has to be configured in such a way that it may withstand the high pressure. The at least one second seal element is arranged in a groove in the first end piece.

In accordance with embodiments, at least one third seal element is arranged between the second end piece and the valve housing. The at least one third seal element seals radially against a second end side of the second end piece on a third end side in the region of the internal thread of the valve housing. A radially circumferential groove is configured in the second end side of the second end piece, in which groove the at least one third seal element is arranged.

In accordance with embodiments, the first end piece and the second end piece are fastened to the valve housing by way of screwing. The first end piece and the second end piece are preferably screwed at the ends of the valve housing in each case to the internal threads which are provided for this purpose. The screwing connection affords the advantage that the shut-off valve is connected releasably. For example, the components which are arranged in the shut-off valve may therefore be exchanged, such as springs, seal elements and pistons. In addition, it is possible in a simple way to preset the pre-stressing force of the spring element, by way of the screwing-in depth of the first end piece into the valve housing, to a desired force which is intended to permit the piston to lift up from the end side of the first end piece only when a defined pressure is reached in the outlet opening during filling. As a result, the tank which is fluidically connected to the shut-off valve, may be filled only as far as a pressure which is defined by the previously set spring force and the shut-off valve may always be held closed reliably even without electric devices, such as, for example, actuators.

In accordance with embodiments, in order that the gaseous medium may be guided into the tank as quickly as possible, the centre axis of the outlet opening of the first end piece is configured so as to be coaxial with the centre axis of the axially continuous bore of the piston.

In accordance with embodiments, the axially continuous bore of the piston has a diameter which is less than the diameter of the outlet opening of the first end piece.

In accordance with embodiments, an annular face is formed on a third end side of the piston, the third end side of the piston facing the first end side of the first end piece. The annular face is defined by the diameter of the axially continuous bore of the piston and the diameter of the outlet opening of the first end piece and is designed depending on the spring force of the elastic element in such a way that, when a predetermined pressure of from 90 to 95% of the shut-off pressure of the tank is reached at the outlet opening of the first end piece, the piston lifts off from the end side of the first end piece, as a result of which the entire surface area of the third end side of the piston becomes active, and the piston is rapidly displaced axially in the direction of the first end side of the second end piece.

The shut-off pressure is defined by the maximum permissible operating pressure of the tank. The shut-off pressure is necessary, in order to prevent damage of the tank or the tank system.

The difference in surface area of the first end side of the piston with respect to the third end side of the piston, the surface area of the third end side of the piston being greater than the surface area of the first end side of the piston, ensures that the shut-off valve remains closed even when the pressure at the inlet opening rises above the shut-off pressure. The shut-off valve remains closed even when the pressure at the inlet opening drops below the shut-off pressure, since the closing force is determined substantially only by the pressure in the tank on the third end face of the piston, minus the force of the disc spring assembly.

In accordance with embodiments, the piston has a first end side, the end side preferably forming a sealing edge. The sealing edge is one which is at least approximately the external diameter of the first end side of the piston. It is particularly advantageous if the sealing edge lies completely on the outer radius of the first end side of the piston, since in this case no additional forces which are induced by the valve inlet pressure may act on the piston in the closed state of the shut-off valve. This ensures that the gaseous medium, on account of the swirl which is imparted by the formation of the flow guiding device, still achieves a sufficient flow even in the case of a very small gap between the sealing edge of the piston and the end side of the second end piece. The sealing edge may be produced from a different material to the piston.

DRAWINGS

Embodiments will be illustrated by way of example in the drawings and explained in the description below.

DESCRIPTION

Figure 1:
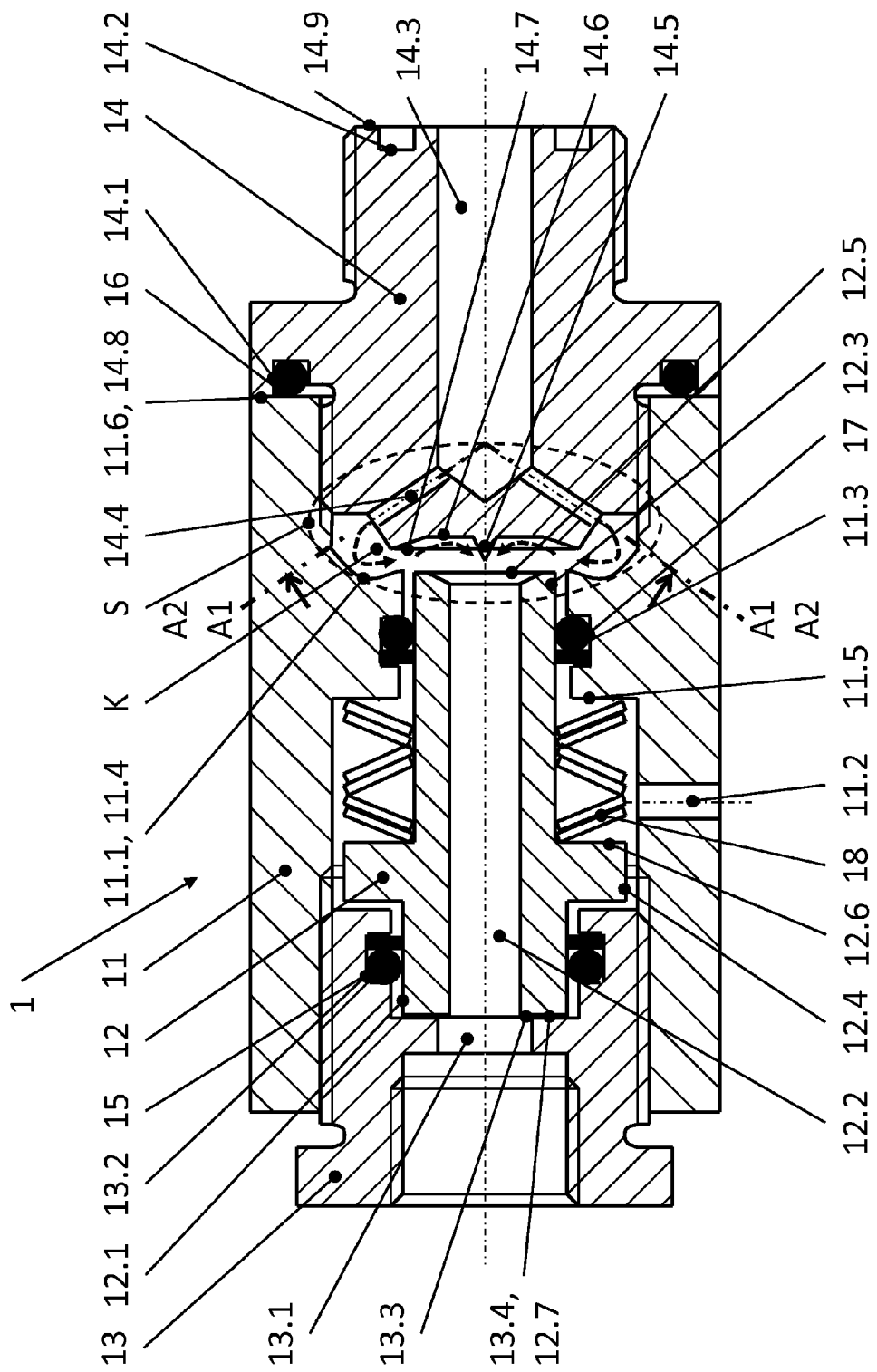
FIG. 1 illustrates a sectional view of a shut-off valve, in accordance with embodiments.

FIG. 1 illustrates a sectional view through a shut-off valve 1 in accordance with the invention. The shut-off valve 1 comprises substantially a valve housing 11, an axially displaceable piston 12, a first end piece 13 and a second end piece 14. The first end piece 13 and the second end piece 14 are mechanically connected to the valve housing 11, such as, for example, being screwed into the valve housing 11. The first end piece 13 has an external thread which may be screwed to the internal thread of the valve housing 11. Furthermore, the first end piece 13 has an internal thread, by way of which the said first end piece 13 may be connected to a tank (not illustrated). The internal thread is fluidically-connected to the outlet opening 13.1 of the first end piece 13. The first end piece has a groove 13.2, in which at least one first seal element 15 is arranged.

The piston 12 is arranged in the valve housing 11 and is mounted by the at least one first seal element 15 on a first sliding face 12.1 which is configured as a sealing face. The second end piece 14 likewise has an external thread, by way of which it may be screwed to the valve housing 11. An external thread is provided for connection to the filling system or to corresponding pipelines (not illustrated). At least one second seal element 16 is arranged in a second end side 14.8 of the second end piece 14 in a first radially circumferential groove 14.1. A second radially circumferential groove 14.2 which is likewise configured on a third end side 14.9 of the second end piece 14 serves to receive a further seal element (not illustrated). The second end piece 14 has an inlet opening 14.3, through which a gaseous medium may flow from the tank system in the direction of the tank during filling.

The inflowing gas enters into a chamber K through a flow guiding device S having radially outwardly arranged bores 14.4. The radially outwardly arranged bores 14.4 of the second end piece 14, the chamber K, and a bulge 14.5 arranged on the first end side 14.7 of the second end piece 14, the bulge 14.5 of the second end piece 14 defining the shape of a point. Furthermore, the flow guiding device S comprises a first end side 11.4 in the valve housing 11, the first end side 11.4 in the valve housing 11 having a radially circumferential, concave formation 11.1 which extends from the inner wall of the valve housing 11 in the direction of the cavity of the valve housing 11, and a radially circumferential, concave formation 14.6 on the first end side 14.7 of the second end piece 14, the radially circumferential, concave formation 14.6 forming a running transition with the bulge 14.5 of the second end piece 14.

As a result of the above-described flow guiding device S, the gaseous medium flows particularly advantageously in the direction of the axially continuous bore 12.2 of the piston 12. This is advantageous when the gap, and therefore, the chamber K are reduced in size when the piston 12 is displaced in the direction of the first end side 14.7 of the second end piece 14, since the gaseous medium may flow almost without flow losses into the axially continuous bore 12.2 of the piston 12 as a result of the deflections of the radial circumferential, concave formations 11.1, 14.6.

An at least third seal element 17 serves to seal between the valve housing 11 and a second sliding face 12.3 of the piston 12. The at least third seal element 17 is arranged in a groove 11.3, the groove 11.3 being arranged in the region between the first end side 11.4 and second end side 11.5 of the valve housing 11 formed in the cavity. Furthermore, the second at least one seal element 17 serves to mount the piston 12 in the valve housing 11.

The piston 12 has a collar 12.4, the collar being arranged between the first sliding face 12.1 and the second sliding face 12.3 of the piston. The collar 12.4 has a second end side 12.6 of the piston, which second end side 12.6 faces the second end side 11.5 of the valve housing 11.

An elastic element 18 is arranged in the cavity of the valve housing 11, the elastic element 18, may comprise a disc spring assembly. Ideally, the overlap of the surface areas of the first end side 13.4 of the first end piece 13 and the third end face of the piston 12.7 in accordance with the diameter of the axially continuous bore 12.2 and the diameter of the outlet opening 13.1 and the spring force which is set is such that the piston lifts upwardly when the pressure at the outlet opening 13.1 of the first end piece 13 has reached from 90 to 95% of the pressure at the inlet opening 14.3 of the second end piece 14.

Since the annular face 13.3 is increased to the diameter of the first sliding face 12.1 of the piston 12 after the piston 12 has lifted off from the first end side 13.4 of the first end piece 13, the piston 12 is displaced relatively rapidly in the direction of the first end side 14.7 of the second end piece 14 until the piston 12 seals against the first end side 14.7 of the second end piece 14 and interrupts the flow of the gaseous medium. The sealing takes place via the first end side 12.5 of the piston 12, which first end side 12.5 forms a sealing edge. The sealing edge is a substantially outwardly radially circumferential edge of the first end side 12.5 of the piston 12. The radially circumferential edge of the piston 12 may have a bevelled or rounded portion, for example, in the region of the first end side 12.5 of the piston 12.

A ventilation bore 11.2 is provided in the valve housing 11 in the region of the elastic element 18, which ventilation bore 11.2 permits pressure equalization of the air in the valve housing 11 between the two at least one first and third seal elements 15 and 17 when the piston 12 is displaced axially.

Figure 3:
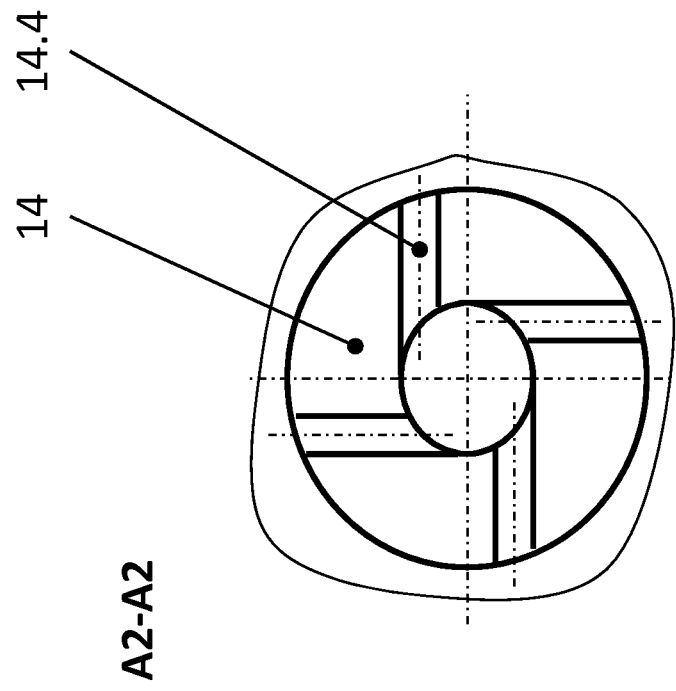
FIG. 3 illustrates a sectional view along A2-A2 of the radially outwardly arranged bores of the shut-off valve, in accordance with embodiments.
Figure 2:
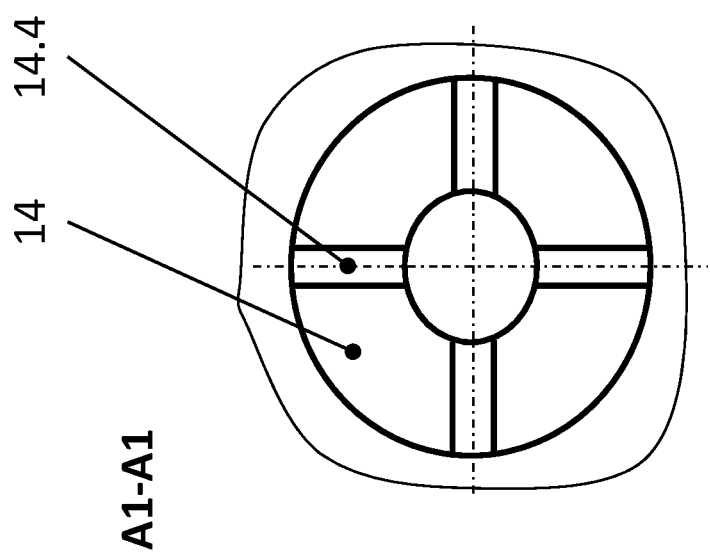
FIG. 2 illustrates a sectional view along A1-A1 of radially outwardly arranged bores of the shut-off valve, in accordance with embodiments.

FIGS. 2 and 3 are a section A1-A1 and A2-A2, respectively, through the radially outwardly arranged bores 14.4 of the second end piece.

In FIG. 2, the radially outwardly arranged bores 14.4 are arranged centrally with respect to the centre axis of the inlet opening 14.3 of the second end piece 14. In FIG. 3, the radially outwardly arranged bores 14.4 of the second end piece 14 are arranged tangentially with respect to the centre axis of the inlet opening 14.3 of the second end piece 14. As a result, the gaseous medium has swirl imparted to it, as a result of which the gaseous medium is directed more rapidly in the direction of the axially continuous bore 12.2 of the piston 12, whereby an enhanced flow behaviour is achieved.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Shut-off valve
11 Valve housing
11.1 Radially circumferential, concave formation
11.2 Ventilation bore
11.3 Groove
11.4 First end side
11.5 Second end side
11.6 Third end side
12 Piston 12.1 First sliding face
12.2 Axially continuous bore
12.3 Second sliding face
12.4 Collar
12.5 First end side
12.6 Second end side
12.7 Third end side
13 First end piece
13.1 Outlet opening
13.2 Groove
13.3 Annular face
13.4 First end side
14 Second end piece
14.1 Groove
14.2 Groove
14.3 Inlet opening
14.4 Radially arranged bores
14.5 Bulge
14.6 Radially circumferential, concave formation
14.7 First end side
14.8 Second end side
14.9 Third end side
15 First seal element
16 Second seal element
17 Third seal element
18 Elastic element
K Chamber
S Flow guiding device

What is claimed is:

1. A shut-off valve to fill a tank with a gaseous medium, the shut-off valve comprising:
    a valve housing having a first end piece with an outlet opening, and a second end piece having an inlet opening and a first end side;
    a piston axially displaceable in the valve housing and having a centrally located and axially continuous piston bore which is fluidically-connected to the outlet opening and the inlet opening, and a first end side which, upon contact, forms a seal with the first end side of the valve housing;
    a flow guiding device downstream of the inlet opening and defining with the second end piece at least one radially-outwardly bore which is fluidically-connected to the inlet opening; and
    a chamber between the piston and the second end piece,
    wherein a gaseous medium is to flow from the inlet opening via the at least one bore into the chamber, and then directed towards the first end side of the second end piece where the gaseous medium is deflected towards piston bore.

2. The shut-off valve of claim 1, further comprising a bulge on the first end side of the second end piece.

3. The shut-off valve of claim 2, wherein the bulge is to be substantially coaxial with a centre axis of the piston bore.

4. The shut-off valve of claim 2, wherein the valve housing has a first end side which has a radially circumferential, concave formation that is to deflect the gaseous medium towards the bulge of the second end piece.

5. The shut-off valve of claim 2, wherein the bulge forms a point having a diameter that is less than a diameter of the piston bore.

6. The shut-off valve of claim 5, wherein the first end side of the second end piece has a radially circumferential, concave formation.

7. The shut-off valve of claim 6, wherein the radially circumferential, concave formation forms a running transition with the point.

8. The shut-off valve of claim 1, wherein the first end piece is to lie opposite the second end piece.

9. The shut-off valve of claim 1, wherein the at least one bore of the second end piece has a cross-section which corresponds at least to a cross-section of the inlet opening of the second end piece.

10. The shut-off valve of claim 1, wherein the at least one bore of the second end piece is arranged offset tangentially with respect to a centre axis of the inlet opening of the second end piece, such that the at least one bore brings about swirling of the gaseous medium during filling.

11. The shut-off valve of claim 1, further comprising an elastic element arranged between the piston and the valve housing and which is to prestress the piston axially against the first end piece.

12. The shut-off valve of claim 11, wherein the elastic element comprises at least one disc spring.

13. The shut-off valve of claim 1, further comprising at least one seal element arranged between the piston and the valve housing.

14. The shut-off valve of claim 13, wherein at least one first seal element is arranged between a first sliding face of the piston and the first end piece.

15. The shut-off valve of claim 1, further comprising at least one seal element arranged between the second end piece and the valve housing.

16. The shut-off valve of claim 1, wherein a centre axis of the outlet opening of the first end piece is coaxial with a centre axis of the piston bore.

17. The shut-off valve of claim 1, wherein the piston bore has a diameter that is less than a diameter of the outlet opening of the first end piece.

18. The shut-off valve of claim 1, wherein the seal between the first end side of the piston and the first end side of the valve housing is removed by axially displacement of the piston away from the first end piece and towards the second end piece when a pressure of between 90 to 95% of a shut-off pressure of a tank is reached at the outlet opening of the first end piece.

19. The shut-off valve of claim 1, wherein the first end side of the piston forms a sealing edge.

20. A shut-off valve to fill a tank with a gaseous medium, the shut-off valve comprising:
    a valve housing;
    a first end piece connected at one end of the valve housing, and having an outlet opening axially extending therethrough;
    a second end piece connected at another end of the valve housing, and having an inlet opening axially extending therethrough;
    a piston axially displaceable in the valve housing between the first and second end pieces, and which upon contact, forms a seal with the first end piece, and further which has a piston bore axially extending and centrally located therethrough which is fluidically-connected to the outlet opening and the inlet opening; and
    a flow guiding device downstream of the inlet opening and defining with the second end piece at least one radially-outwardly bore which is fluidically-connected to the inlet opening, wherein the gaseous medium is to flow from the inlet opening, and then directed towards the second end piece where a gaseous medium is deflected towards the piston bore.

* * * * *